March 17, 1953 — M. KRAMCSAK, JR — 2,631,328
CASTER
Filed May 18, 1949

Inventor
Michael Kramcsak, Jr.
By Rockwell & Bartholow
ATTORNEYS

Patented Mar. 17, 1953

2,631,328

UNITED STATES PATENT OFFICE 2,631,328

CASTER

Michael Kramcsak, Jr., Bridgeport, Conn., assignor to The Bassick Company, Bridgeport, Conn., a corporation of Connecticut Application May 18, 1949, Serial No. 93,988

5 Claims. (Cl. 16—18)

This invention relates to casters, and more particularly to those used on creepers used under automobiles in repair shops and on like structures in which it is desirable to have the creeper or carrier body at a minimum distance from the floor. Creepers have been equipped with casters in which the wheel, for purposes of reducing the over-all height, turns on an axis that is arranged at an angle to the vertical, but the casters of this type previously used had a number of practical drawbacks, and did not give satisfactory service.

One of the objects of the present invention is to provide a caster suitable for use on creepers, which is of improved structure and which does not have the drawbacks and disadvantages of previous articles used for the purpose.

Another object is to provide a caster structure of minimum height in which easy swiveling of the caster is maintained, and in which there is no objectionable friction and binding of the wheel.

Another object is to provide a duplex structure embodying a swiveling stem and a wheel-supporting stem, in which these stems are of minimum length in order to reduce the bending moment, and in which the structure is of maximum simplicity, compactness and strength.

Another object is to provide a structure which greatly facilitates the fabrication and assemblage of the parts.

Figure 1:
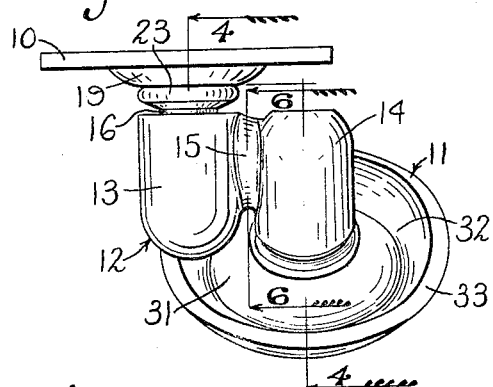
Fig. 1 is a side elevation of a caster embodying my improvements.
Figure 2:
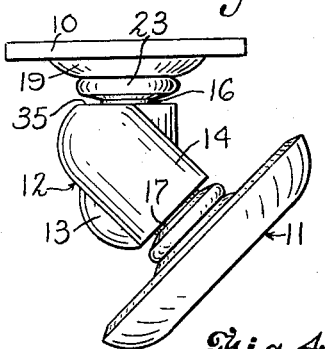
Fig. 2 is an elevation at right angles to Fig. 1.
Figure 3:
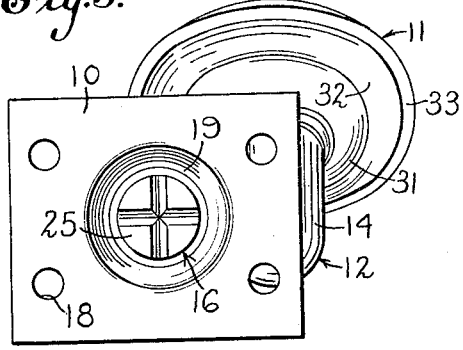
Fig. 3 is a top plan view.

In the illustrated construction shown in Figs. 1 to 6, inclusive, by way of example, the caster is applied to the creeper body or like object by means of an attaching plate having a downwardly projecting stem entering and freely rotatable with respect to an upwardly facing socket part of a duplex body member which may be formed as a casting, and which has a downwardly facing socket part located to one side of the first-named socket part and at an inclination thereto, the second-named socket part serving to receive the freely rotatable stem of the caster wheel. The two socket parts are interconnected by a connecting web of metal integral with both of them, and the axis of the floor-engaging wheel is in this particular case arranged at an angle of substantially 45° to the vertical. The swiveling stem previously mentioned extends through and is suitably secured in the attaching plate, and the wheel-supporting stem extends through and is suitably fixed to the central part of the wheel. In this particular case the stems have fastening or securing means disposed within the respective sockets constituted by friction rings carried by the stems and having frictional engagement with the inner socket surfaces whereby the stems while freely rotatable are prevented from becoming displaced in their sockets under ordinary conditions, although the stems are removable and replaceable when that is necessary.

In the drawing, the attaching plate is indicated at 10, the caster wheel at 11, the duplex supporting body at 12, the swiveling socket part of said body at 13, the wheel-supporting socket part at 14, the connecting web at 15, the swiveling stem at 16, and the wheel-carrying stem at 17.

The attaching plate 10 is shown as a rectangular plate having holes 18 for attaching screws. The middle portion of this plate is depressed, as shown at 19, and the stem 16 is fastened to the plate within this depressed portion.

Figure 5:
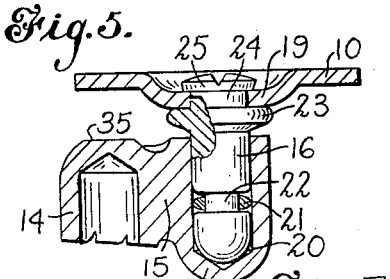
Fig. 5 is a section on line 5—5 of Fig. 4.

As shown in Fig. 5, the socket part 13 is provided with a vertical socket 20 having a cylindrical inner surface. The stem 16 is cylindrical, and rounded at the lower end, and the lower end rests in the bottom of the socket 20. The stem is held in the socket against withdrawal under ordinary conditions, by means of a friction ring 21 located in an annular groove 22 of the stem about midway of the length of the stem. Immediately above the socketed part 13 the stem is provided with a laterally extending integral flange or collar 23 which lies against the lower surface of the depressed part 19 of the attaching plate. A part 24 of the stem extends through a hole in the part 19, and the upper end of the stem is laterally displaced, as by staking, to provide a flange 25 overlying the depressed part 19 and clinching the attaching plate to the stem, so that for all practical purposes the stem and plate are integral with each other.

The wheel 11 is attached to the stem 17 in much the same manner as the stem 16 is fastened to the attaching plate, and for this purpose the wheel has a central hole and the stem is provided with a collar 26 and below it (Fig. 4) with a cylindrical part 27 and a clinching flange 28 corresponding to parts described above. However, in this particular case a metal washer 29 is interposed between the flange 28 and the body of the wheel. The stem 17 is provided with a friction ring 21, such as previously described. The stem 17 and its receiving socket part 14 are of the same shape and of substantially the same size as the corresponding parts 16 and 13, described above, and for this reason the stems employed in this structure are interchangeable, each stem being usable in either socket, which is a feature of manifest advantage in assembling the article. It is also a feature of advantage that the stems used in mounting the plate and wheel, respectively, are of similar structure, together with their associated fastening devices, such as the friction rings 21, and that the process of applying the wheel to the stem is substantially the same as that of applying the attaching plate to the stem.

Figure 4:
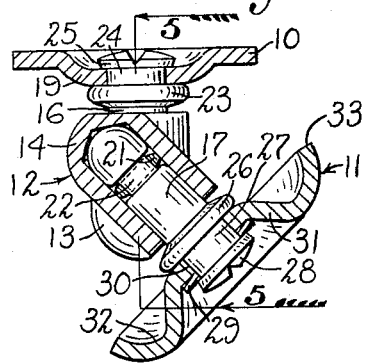
Fig. 4 is a section on line 4—4 of Fig. 1.

It will be noted from Fig. 4 that the wheel 11 is one of special profile, having a boss-like part around the central hole or perforation and having an upturned peripheral portion, the latter portion together with the boss providing an upwardly facing trough or valley. The inner or upper surface of the valley part is disposed on a curve so as to be concave from the edge of the wheel to the region where the boss begins, and the lower surface of the wheel has a shape corresponding to the upper surface. In the form shown in Fig. 4, the part of the wheel in which the central perforation is formed is in substantially the same plane as the upturned edge of the wheel. In the drawing, the central perforation of the wheel is indicated at 30, the boss portion, previously referred to, at 31, the trough or valley at 32, and the extreme edge of the wheel at 33. The floor-engaging part of the wheel is the part of the lower surface between the edge and the boss, which is convex. The arc on which this peripheral convex floor-engaging part of the wheel is formed is an arc of comparatively small radius, comparable to about one half of the radial dimension of the wheel disk. The point where the wheel engages the floor is in vertical alinement with the swiveling axis, as will be apparent from Fig. 4. By dishing the outer peripheral part of the wheel on a small radius, the substantially conical boss or hub portion of the wheel can be brought up to substantially the plane of the wheel edge, thus permitting the use of a wheel-carrying stem of minimum length, this stem not being substantially longer than the swiveling stem.

This arrangement and structure of the wheel element provides a wheel that can be readily formed by stamping a sheet metal piece of proper thickness and which is very strong and rugged and well reinforced by virtue of its shape so as to resist strains in all directions, and with these advantages there is the advantage that the carrying stem can be relatively short and the wheel itself of relatively slight depth in a lateral direction, thereby providing a narrow wheel which has the required strength having a tread portion that is curved in cross section and makes linear contact with the floor rather than contact over a large area. The linear contact with the floor reduces friction and yet the form of the wheel tread is such as to inhibit injury to the underlying surface in case the surface lacks a great degree of hardness.

Figure 6:
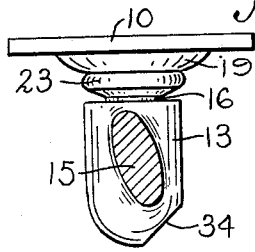
Fig. 6 is a section on line 6—6 of Fig. 1.

The connecting portion 15 of the body 12 is of substantial thickness, as shown in Fig. 6, so as to give rigid support to the two socket parts while spacing them apart to a certain extent. This connecting portion, as shown in Fig. 6, is of generally elliptical cross section, having its major axis slightly inclined to the vertical, the upper end being slightly offset in one direction from the axis of the socket part 13, and the lower end being offset in the opposite direction with reference to this axis. The socket parts of the body in general have their closed ends in the form of domes, the same being gently rounded, but for the purpose of providing better clearance the part 13 is provided at one side with a flattened surface 34, and the part 14 has a similar flattened surface 35. These flattened surfaces are in each case disposed in the same plane as the open end or mouth of the other socket part. The upper ends of the socket parts 13 and 14 are located in one horizontal plane and the lower ends thereof are located in another horizontal plane.

It will be noted that the stems of the caster, while short, are of relatively large diameter, having cylindrical bodies contacting at the sides with the side surfaces of the sockets. The ends of the stems which bottom in the sockets are gently rounded so as to present dome-shaped end portions. The end portions of the sockets in which the stems bottom preferably are formed to present shallow cones, as shown, for example, in Fig. 5, and each of these cone-shaped socket portions makes substantially line contact with the dome-shaped or gradually rounded end of the corresponding stem.

In the operation of the caster, the wheel, having its general plane at about 45° to the floor and having its stem at substantially the same angle to the floor, is subject to considerable strains when the creeper is loaded, but these are effectively resisted and the wheel effectively supports the creeper when in stationary position or in rolling movement, and the wheel stem rotates freely in its socket without sticking or binding and without objectionable noise. The stem-equipped attaching member having similar cooperation with the swiveling part of the caster body provides for a free swiveling action of the wheel.

Figure 7:
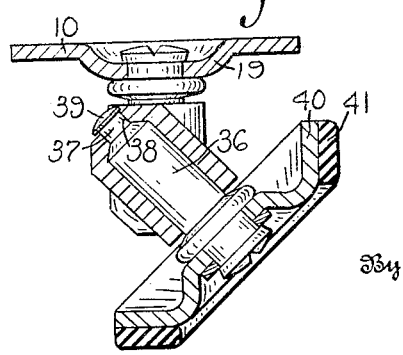
Fig. 7 is a section similar to Fig. 4, illustrating a modified form.

In the modified form shown in Fig. 7, the stems are of the structure indicated by way of example at 36, each such stem having a cylindrical body and having at the end opposite the wheel (or attaching plate) a neck 37 extending through a hole 38 in the end of the socket part and peened over, as indicated at 39, so as to hold the stem against longitudinal displacement. In this form also the wheel 40 has a different profile from the one previously described, the peripheral portion being disposed in one plane instead of being dished, and an annular piece 41 of rubber or the like being cemented to this part so as to give the wheel a certain amount of cushioning. In this instance the part 41, like the part 40, lies in a single plane, but obviously changes may be made in this as well as other respects. It will also be noted that in this form the middle part of the wheel is displaced upwardly so as to minimize the length of its supporting stem, but in this case the part of the wheel having the central hole is disposed in a plane offset downwardly to some extent from the plane in which the extreme edge of the metal portion of the wheel is located.

The described construction of a caster is one in which it is entirely practical to have the wheel axis at an angle of at least 45° to the horizontal. In the particular case shown, the wheel axis is disposed at this angle. The structure is a very serviceable and durable one, applicable to creepers and other articles in which it is desirable to have the caster of minimum vertical dimension. The construction is one in which the caster swivels very easily, and there is no objectionable friction or binding in connection with the floor-engaging wheel. The duplex body of the caster is of especially sturdy and durable character and gives effective support to the wheel. The two socket parts of the body are laterally offset from each other sufficiently to provide two complete sockets, and the connecting web at an angle to each of the sockets gives them effective and strong support. In assembling, if the operation is that of placing the attaching plate stem in position, for example, this stem may be inserted into either socket that presents itself as the socketed body is picked up by the assembler, and this obviously makes for very quick and convenient assemblage. Inasmuch as both of the stems are relatively short, the bending moments to which the stems are subject when the article is in service are considerably reduced, thereby providing a stronger structure and at the same time reducing cost. The generally smooth and rounded formation of the caster body is also of advantage, inasmuch as there is minimum interference with or entanglement of extraneous articles.

While two forms of the article are illustrated, various other modifications and changes may be made without departure from the principles of the invention or the scope of the claims.

What I claim is:

1. A caster comprising a duplex socketed body, said body having an upwardly facing socket part adapted to be positioned vertically and a laterally offset socket part facing downwardly the axis of which is arranged at an acute angle to that of the first socket part and rigidly connected to the first socket part by a connecting web integral with said socket parts, stems in the respective socket parts which are of identical size and shape, a wheel attached to one stem, and an attaching fixture attached to the other stem.

2. A caster comprising a duplex socketed body, said body having an upwardly facing socket part adapted to be positioned vertically and a laterally offset socket part rigidly supported from the first socket part and facing downwardly, the axis of the offset socket part being arranged at an acute angle to that of the first socket part, stems for the respective socket parts, a wheel for one stem and an attaching plate for the other stem, said stems being interchangeable with respect to said wheel and said attaching plate, one stem in the upwardly facing socket part and having one end thereof connected to said attaching plate, and the other stem in the downwardly facing socket part and having one end thereof connected to said wheel.

3. A caster comprising a duplex socketed body, said body having an upwardly facing socket part adapted to be positioned vertically and a laterally offset socket part rigidly supported from the first socket part and facing downwardly, the axis of the offset socket part being arranged at an acute angle to that of the first socket part, stems for the respective socket parts, a wheel for one stem, and an attaching plate for the other stem, said stems being interchangeable with respect to said wheel and said attaching plate, one stem in the upwardly facing socket part and having one end thereof connected to said attaching plate, and the other stem in the downwardly facing socket part and having one end thereof connected to said wheel, said stems extending through the respective socket parts and having their other ends peened over.

4. A caster comprising a duplex socketed body, said body having an upwardly facing socket part vertically disposed and closed at the bottom and a second socket part spaced laterally from the first so as to be substantially offset therefrom and facing downwardly and closed at the top and the axis of which is arranged at an angle of approximately 45° to that of the first socket part, the uppermost parts of said socket parts being substantially in alignment horizontally and the lower-most parts of said socket parts being substantially in alignment horizontally, an attaching-plate-carrying stem disposed in the first socket part and rotatable therein, a wheel-carrying stem disposed in the second socket part and rotatable therein, said wheel-carrying stem having externally of its socket an attaching flange and below said flange a wheel-supporting neck, a narrow sheet-metal wheel on said neck staked against said flange and turned upwardly at its periphery and shaped to make line contact with a supporting surface underlying the peripheral portion of the wheel, and cooperating means provided on each stem and its corresponding socket part to inhibit axial displacement of the stem.

5. In a caster, a duplex socketed body, said body having two elongated socket parts laterally offset from each other and interconnected by a connecting web, the uppermost parts of the socketed body being in one horizontal plane and the lowermost parts of said socketed body being in another horizontal plane, the axis of one socket part being vertically disposed and the axis of the other being inclined to the first axis and crossing it at an acute angle, one of said socket parts having an open end which is faced upwardly and a closed end faced downwardly and the other having an open end which is faced downwardly and a closed end faced upwardly, said connecting web being of generally elliptical cross section and having its major axis inclined with respect to the axes of both socket parts.

MICHAEL KRAMCSAK, Jr.

REFERENCES CITED

The following references are of record in the file of this patent:

UNITED STATES PATENTS

| Number | Name | Date |
|---|---|---|
| 10,331 | Pederson | May 22, 1883 |
| 309,273 | Whitney | Dec. 16, 1884 |
| 932,038 | Maier | Aug. 24, 1909 |
| 985,492 | Arbeiter | Feb. 28, 1911 |
| 1,465,044 | Johnson | Aug. 14, 1923 |
| 1,873,888 | Herold | Aug. 23, 1932 |
| 1,975,661 | Powell | Oct. 2, 1934 |

FOREIGN PATENTS

| Number | Country | Date |
|---|---|---|
| 17,466 | Great Britain | of 1905 |